US008813572B2

(12) United States Patent
Hedtke

(10) Patent No.: US 8,813,572 B2
(45) Date of Patent: Aug. 26, 2014

(54) FERROFLUID MODIFIED FILL FLUID FOR PRESSURE TRANSMITTERS

(75) Inventor: Robert Carl Hedtke, Young America, MN (US)

(73) Assignee: Rosemount Inc., Bloomington, MN (US)

( * ) Notice: Subject to any disclaimer, the term of this patent is extended or adjusted under 35 U.S.C. 154(b) by 385 days.

(21) Appl. No.: 13/311,714

(22) Filed: Dec. 6, 2011

(65) Prior Publication Data
US 2013/0139565 A1 Jun. 6, 2013

(51) Int. Cl.
*G01L 9/10* (2006.01)
(52) U.S. Cl.
USPC .............................. 73/722; 73/728
(58) Field of Classification Search
None
See application file for complete search history.

(56) References Cited

U.S. PATENT DOCUMENTS

| | | | |
|---|---|---|---|
| 3,956,938 A | 5/1976 | Carrico | |
| 4,356,098 A | 10/1982 | Chagnon | |
| 4,788,867 A | 12/1988 | Kishel | |
| 5,396,802 A | 3/1995 | Moss | |
| 5,665,899 A | 9/1997 | Willcox | |
| 7,063,802 B2 | 6/2006 | Tsuda et al. | |
| 7,373,831 B2 * | 5/2008 | Broden | 73/715 |
| 7,377,176 B1 | 5/2008 | Broden | |
| 7,591,184 B2 | 9/2009 | Broden | |
| 7,918,134 B2 | 4/2011 | Hedtke et al. | |
| 2006/0162459 A1 * | 7/2006 | Broden | 73/715 |
| 2007/0277608 A1 | 12/2007 | Lopatin et al. | |
| 2008/0223140 A1 | 9/2008 | Broden | |
| 2008/0282806 A1 | 11/2008 | Chakraborty | |
| 2010/0083731 A1 | 4/2010 | Hedtke | |
| 2012/0079884 A1 * | 4/2012 | Broden et al. | 73/717 |
| 2012/0125112 A1 * | 5/2012 | Volonterio et al. | 73/715 |
| 2012/0197553 A1 * | 8/2012 | Volonterio et al. | 702/50 |
| 2013/0333440 A1 * | 12/2013 | Hedtke | 73/1.57 |

OTHER PUBLICATIONS

International Search Report, mailed Nov. 7, 2012.

* cited by examiner

*Primary Examiner* — Andre Allen
(74) *Attorney, Agent, or Firm* — Kinney & Lange, P.A.

(57) ABSTRACT

A pressure transmitter for measuring a pressure of a process fluid comprises a transmitter housing, a pressure sensor, a hydraulic relay system, a ferrofluid and transmitter electronics. The capacitance-based pressure sensor senses the pressure of the process fluid and is disposed within the housing. The hydraulic relay system comprises an isolation diaphragm positioned on an exterior of the transmitter housing, and an isolation tube extending from the pressure sensor to the isolation diaphragm. The ferrofluid is located in the isolation tube to transmit a change in the pressure of the process fluid at the isolation diaphragm to the sensor. The transmitter electronics are positioned within the housing and are configured to receive and condition a pressure signal from the pressure sensor.

27 Claims, 5 Drawing Sheets

FERROFLUID MODIFIED FILL FLUID FOR PRESSURE TRANSMITTERS

BACKGROUND

This invention relates generally to process instruments used in industrial process control systems. More particularly, the present invention relates to oil filled process transmitters such as pressure transmitters having capacitive pressure sensors.

Process instruments are used to monitor process parameters, such as pressure, temperature, flow and level, of process fluids used in industrial processes. For example, process transmitters are typically employed in industrial manufacturing facilities at multiple locations to monitor a variety of process parameters along various production lines. Process transmitters include sensors that produce an electrical output in response to physical changes in the process parameter. For example, pressure transmitters include capacitive pressure sensors that produce an electrical output as a function of the pressure of a process fluid, such as water lines, chemical tanks or the like. Each process transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room. Configured as such, the process parameter can be regulated from the control room by including automated switches, valves, pumps and other similar components in the control loop.

A typical capacitive pressure sensor used in a pressure transmitter includes a fixed electrode plate and a movable electrode plate, which typically comprises a flexible sensing diaphragm. The sensing diaphragm is connected to the process fluid through a simple hydraulic system that communicates the process fluid pressure to the sensor. The hydraulic system comprises a sealed passageway in which the sensing diaphragm is positioned at a first end, and a flexible isolation diaphragm is positioned at a second end to engage the process fluid. The sealed passageway is filled with a precise amount of hydraulic fluid that adjusts the position of the sensing diaphragm as the process fluid influences the isolation diaphragm. As the pressure of the process fluid changes the position of the sensing diaphragm changes, resulting in a change in capacitance of the pressure sensor. The electrical output of the pressure sensor is related to the capacitance and thus changes as the process fluid pressure changes.

The capacitance of the pressure sensor is controlled by three main factors: the surface area of the electrode plates, the distance between the electrode plates and the magnitude of the dielectric constant of the matter between the electrode plates, typically the hydraulic fluid. It is generally desirable to produce pressure sensors as small as possible such that they can be used in a greater number of applications. The lower limit on the spacing between the electrodes is limited by the ability of the capacitor to function properly. The lower limit on the surface area of the plates is dictated by the necessity of the pressure sensor to generate a signal having a minimum strength compatible with the transmitter electronics. Spacing and surface area parameters are also limited by manufacturing tolerances. The dielectric constant of the matter between the plates is limited by the types of fill fluids that are compatible with the hydraulic system. There is, therefore, a need for capacitive-based pressure sensors having higher capacitances.

SUMMARY

A pressure transmitter for measuring a pressure of a process fluid comprises a transmitter housing, a pressure sensor, a hydraulic relay system, a ferrofluid and transmitter electronics. The capacitance-based pressure sensor senses the pressure of the process fluid and is disposed within the housing. The hydraulic relay system comprises an isolation diaphragm positioned on an exterior of the transmitter housing, and an isolation tube extending from the pressure sensor to the isolation diaphragm. The ferrofluid is located in the isolation tube to transmit a change in the pressure of the process fluid at the isolation diaphragm to the sensor. The transmitter electronics are positioned within the housing and are configured to receive and condition a pressure signal from the pressure sensor.

DETAILED DESCRIPTION

Figure 1:
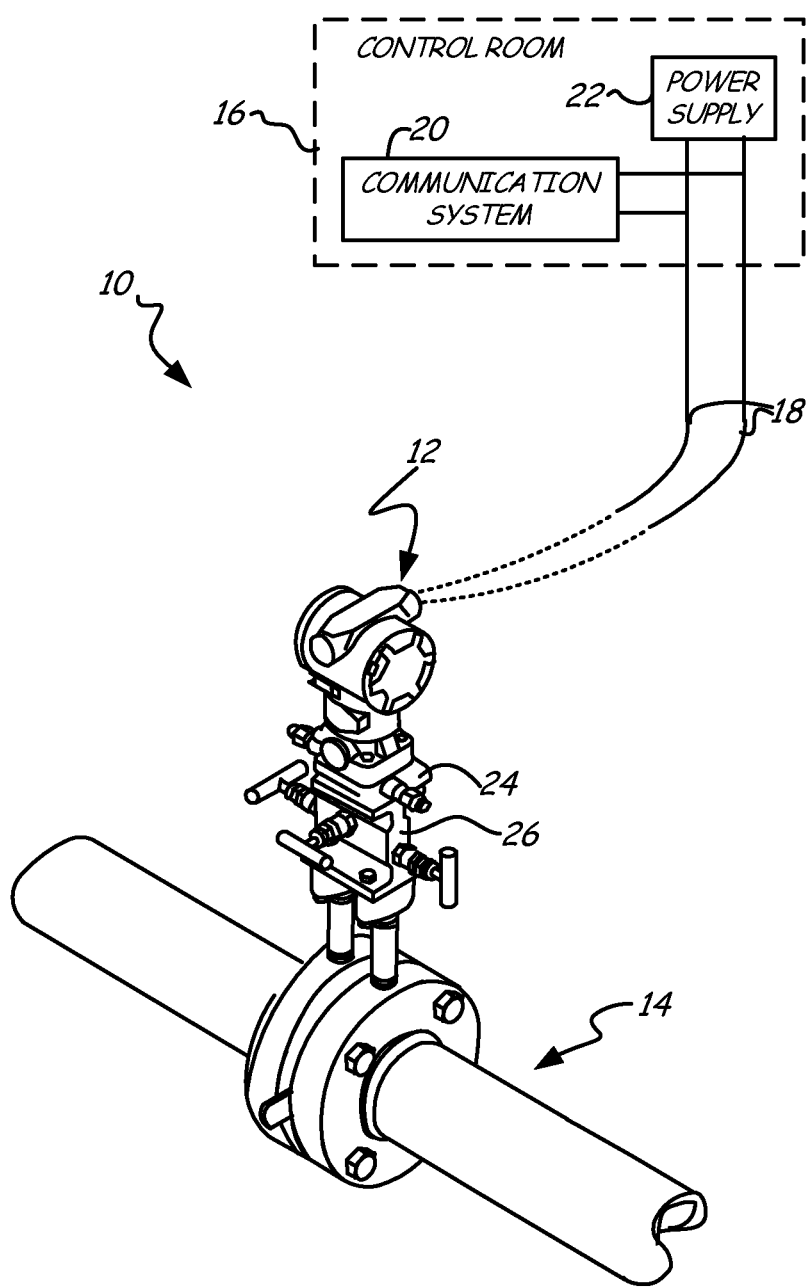
FIG. 1 shows a process control system, including a pressure transmitter, in which the ferrofluid modified fill fluid of the present invention is used.

FIG. 1 shows process control system 10 in which process transmitter 12 of the present invention is used. Process control system 10 includes process transmitter 12, pipeline 14, control room 16 and control loop 18. Control room 16 includes communication system 20 and power supply 22. In this embodiment, process transmitter 12 is coupled with piping 14, in which a process fluid flows, through process flange 24 and manifold 26. Process transmitter 12 includes a process sensor and transmitter circuitry for generating an electrical signal based on a sensed pressure of the process fluid. Process transmitter 12 also includes other electrical components for transmitting the electrical signal over control loop 18 to control room 16 or a local display such as an LCD screen, or both.

In one embodiment, process transmitter 12 is a two-wire transmitter for operating on a 4-20 mA loop. In such an embodiment, control loop 18 includes a pair of wires for supplying power to process transmitter 12 from power supply 22. Control loop 18 also enables control room 16 to transmit data to and receive data from process transmitter 12 utilizing communication system 20. Typically, a 4 mA DC current provides sufficient energy for operating the sensor and transmitter circuitry of process transmitter 12 and any local display. In other embodiments, process transmitter 12 communicates with control room 16 over a wireless network. Transmitter 12 includes a hydraulic system filled with a ferrofluid that changes the dielectric constant of fluid inside of a pressure sensor to increase the capacitance of the sensor, as discussed with reference to FIG. 2.

Figure 2:
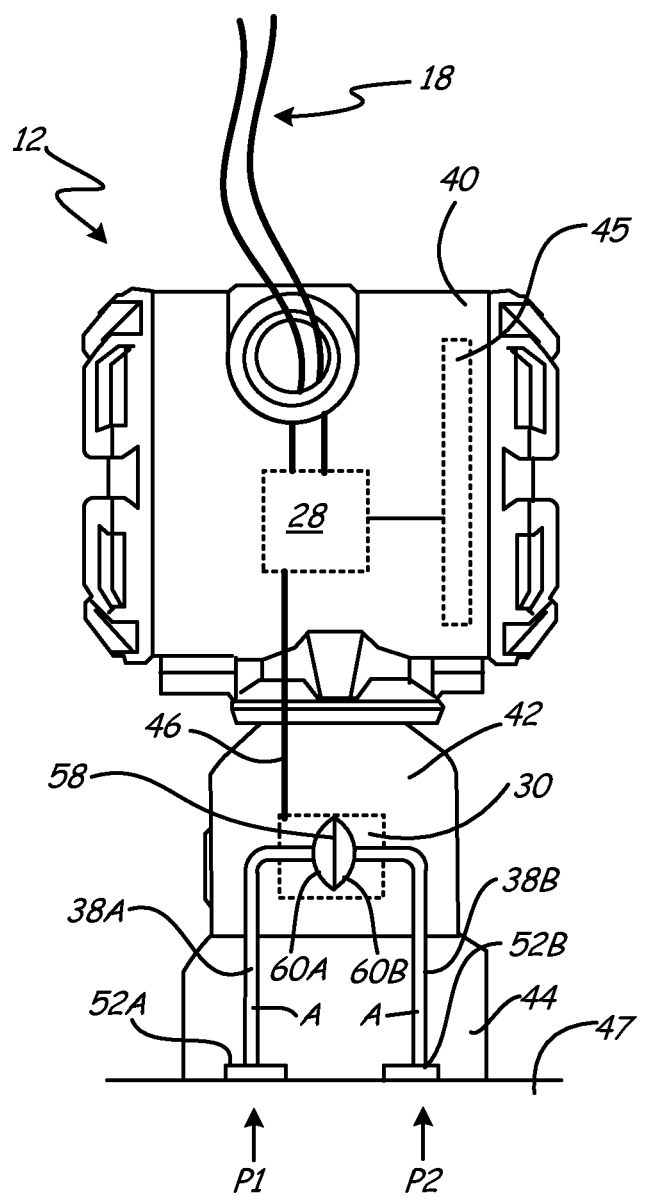
FIG. 2 is a schematic side view of the pressure transmitter of FIG. 1 including a capacitive pressure sensor configured for differential pressure measurement.

FIG. 2 shows pressure transmitter 12 including transmitter electronics 28 and capacitive pressure sensor 30, which in one embodiment of the present invention, comprises a differential pressure sensor having a fill fluid comprised of a ferrofluid. Process transmitter 12 also includes hydraulic isolation tubes 38A and 38B, housing 40, module 42, base 44 and LCD 45. Sensor 30 senses a physical change in the pressure difference P1–P2. Sensor 30 is in electronic communication with transmitter circuitry 28 through cable 46. Circuitry 28 conditions the output of sensor 30 into a format compatible with control loop 18, whereby the output is relayed for local monitoring at LCD 45 connected to electronics 28, or to control room 16 (FIG. 1.) through control loop 18. In other embodiments, transmitter circuitry 28 communicates over a wireless network. In still other embodiments, the conditioned output of sensor 30 is readable by a handheld device linked by wires or wirelessly with pressure transmitter 12. It is appreciated that the present invention may be implemented in a variety of pressure sensors using a fill fluid to isolate the pressure sensor.

Isolation tubes 38A and 38B allow pressure sensor 30 to be brought into contact with the exterior of transmitter 12. Isolation tubes 38A and 38B connect sensor 30 to isolation diaphragms 52A and 52B. Isolation diaphragms 52A and 52B are mounted to a flat, external surface of base 44 to join with process flange 24 (FIG. 1). In one embodiment, process flange 24 comprises a COPLANAR™ process flange. Sensor 30 is a transducer that produces an electrical signal in response to the pressure difference P1–P2. In this embodiment, sensor 30 comprises a differential, capacitance-based pressure cell comprising sensing diaphragm 58, first electrode plate 60A and second electrode plate 60B. Sensor 30 is hydraulically coupled to diaphragms 52A and 52B of base 44 through fill fluid A within isolation tubes 38A and 38B, which are positioned within module 42. Isolation diaphragms 52A and 52B are hydraulically coupled to process fluid pressures P1 and P2. The forces associated with pressures P1 and P2 are transmitted from isolation diaphragms 52A and 52B to sensing diaphragm 58 by fill fluid A, such that the pressures in isolation tubes 38A and 38B equal pressure P1 and P2, respectively. As such a pressure differential P1–P2 is created across sensing diaphragm 58 of sensor 30 by fill fluid A. Fill fluid A occupies sensor 30 to surround sensing diaphragm 58 and occupy the space between sensing diaphragm 58 and electrode plates 60A and 60B. Thus, the capacitance of pressure sensor 30 is directly related to the dielectric constant of fill fluid A. Fill fluid A is a colloidal mixtures comprising a carrier fluid having suspended ferromagnetic particles. The ferromagnetic particles permit diagnostic testing of transmitter 12. Furthermore, the ferromagnetic particles enhance the dielectric properties and performance of sensor 30.

In this embodiment, sensing diaphragm 58 is typically comprised of a circular, stainless steel disk disposed between electrode plates 60A and 60B, which typically comprise circular, metal coatings deposited on interior curved surfaces of sensor 30 to oppose diaphragm 58. Sensing diaphragm 58 is pinched between the peripheries of the curved surfaces such that it is able to flex between electrode plates 60A and 60B. As such, sensor 30 comprises three electrically isolated metallic plates arranged as two capacitors in series that form a generally cylindrical sensor having a width and a diameter. The capacitance between diaphragm 58 and first electrode plate 60A and the capacitance between diaphragm 58 and second electrode plate 60B changes as the curvature of diaphragm 58 changes due to variations in pressures P1 and P2, as presented through fill fluid A. Capacitance between diaphragm 58 and one of electrode plates 60A or 60B will increase while the other will decrease. The change in capacitance of each capacitor due to the pressure change is measured by transmitter circuitry 28 as an indication of the change in magnitude of the differential pressure between pressures P1 and P2.

Generally speaking, the capacitance of a capacitor is an indication of the amount of energy stored on electrode plates comprising the capacitor. The capacitance C is proportional to the area $A_P$ of the electrode plates and the dielectric constant $\in$ of the material between the electrode plates, and inversely proportional to the distance X between the electrode plates, as shown in equation (1).

$$C = \frac{\varepsilon A_P}{X} \qquad \text{Equation (1)}$$

For a capacitive pressure sensor, the output strength of the signal generated by the pressure sensor is determined by the charge stored on the capacitors. In sensor 30, a first capacitor is formed by sensing diaphragm 58 and first electrode plate 60A, and a second capacitor is formed by sensing diaphragm 58 and second electrode plate 60B. There must be enough charge stored on the first and second capacitors such that sensor 30 is capable of resolving very small pressure changes. Typically, a capacitive pressure sensor has a full scale capacitance of about 60 picoFarads (pF). The dielectric constant $\in$ of the dielectric material is fixed by the selected fill fluid. The size of the first and second capacitors is also fixed for a given design, constraining area $A_P$ of the plates of sensor 30.

Typically, the dielectric constant $\in$ of the fill fluid has been limited to small magnitudes due to the mechanical performance requirements needed of the fill fluid. For example, fill fluids must be substantially incompressible such that the fill fluid is able to effectively and accurately transmit pressure. For example, in sensor 30, fill fluid A must be able to transmit very small deflections of diaphragm 52A to sensing diaphragm 58 without the deflection being completely absorbed by compression of fill fluid A. Fill fluids must also be stable and substantially inert so as to prevent reaction with other sensor components. For example, in sensor 30, fill fluid A must not react with sensing diaphragm 58 and electrode plate 60A. Fill fluids must also function within a wide range of temperatures and have desirable toxicity and flammability characteristics.

Fill fluids that meet these demands are typically comprised of silicone-oil hydraulic fluids, such as DC 200®, DC 704® or Syltherm XLT® silicone-oil as is commercially available from Dow Corning Corporation, Midland, Mich., USA. In other embodiments, similar hydraulic fluids can be used such as Halocarbon® from Halocarbon Products Corporation, River Edge, N.J., USA or Neobee® M-200 from Stepan Company, Northfield, Ill., USA. In other embodiments, fill fluid A may be supplemented with additional additives. For example, leak detection and prevention additives may be included in the fill fluid composition when needed.

In the present invention, the fill fluids comprise ferrofluids. Ferrofluids comprise a carrier fluid having a colloidal mixture of nanoscale ferromagnetic particles that impart a paramagnetic quality to the carrier fluid, while increasing the dielectric constant of the carrier fluid in both magnetized and non-magnetized states. Ferromagnetic particles will not settle out of the carrier fluids and accumulate along the passageways and capillaries into which they are dispersed. Ferromagnetic particles are sufficiently small such that Brownian motion maintains the particles suspended in the carrier fluid. Typical ferromagnetic particles are on the order of about 100 angstrom (10 nanometers) in diameter or less. Ferromagnetic particles may be any magnetic particles, such as iron or alloys thereof. Typical particles used in ferrofluids are coated with a dispersant, or surfactant as they are known in the art, such as oleic acid. Surfactants prevent agglomeration or coagulation of the particles within the carrier fluid. The surfactants maintain the particles spaced at distances larger than what can be overcome by Van der Waal forces of attraction. The surfactants additionally provide a barrier between the particles and the carrier fluid so as to prevent undesirable reactions.

Also, ferromagnetic particles are inert such that they will not react with the carrier fluids and will not alter the properties of the carrier fluids in undesirable manners. The ferromagnetic particles will, however, contribute to the overall properties of the fill fluid in quantities proportional to the volumetric distribution of the carrier fluid and ferromagnetic particle volume. That is to say, a fill fluid having fifty percent by volume carrier fluid and fifty percent by volume ferromagnetic particles will have electrical and mechanical properties (e.g. dielectric constant and coefficient of thermal expansion) that are an average of the electrical and mechanical properties of the carrier fluid and ferromagnetic particles. However, in order to preserve the pressure transmitting capability of the fill fluid, it is desirable that the ferromagnetic particles comprise from about five to about twenty percent of the fill fluid.

In a first embodiment, the carrier fluid comprises a conventional fill fluid, such as the aforementioned hydraulic fluids or organic compound fluids, and the ferromagnetic particles are simply mixed in. In a second embodiment, the conventional fill fluids are replaced by pre-formulated ferrofluids having ferromagnetic particles mixed into a carrier fluid selected specifically for use with ferromagnetic particles. U.S. Pat. No. 7,063,802, which is assigned to Ferrotec Corporation, discloses a ferrofluid comprising a hydrocarbon-based or silicone-based carrier fluid using a wide variety of ferromagnetic particles, such as magnetite, which is a ferrite, and maghemite, which is a ferric oxide. U.S. Pat. No. 4,356,098, which is assigned to Ferrofluidics Corporation, discloses a ferrofluid comprising a silicone-oil carrier and ferromagnetic particles such as magnetite, $Fe_3O_4$, and $\alpha Fe_2O_3$. Such ferrofluids are suitable for use with the present invention.

Ferromagnetic particles having high dielectric constants are used to increase the signal of sensor 30. The volume of ferromagnetic particles is suspended in fill fluid A to increase the dielectric constant of the material between pressure diaphragm 58 and capacitor plates 60A and 60B. Accordingly, the amount of charge available for storage in sensor 30 increases as the dielectric constant increases. If the capacitors comprising the sensor are able to store more energy, sensor 30 is able to produce a more noticeable signal for smaller pressure changes. Thus, ferromagnetic particles having a high dielectric constant can be added to fill fluid A to increase the sensitivity of sensor 30. Additionally, from a design standpoint, the size of the capacitor plates forming sensor 30 can be reduced in order to maintain the rest capacitance signal of pressure sensor 30.

The capacitance of sensor 30 is further increased by the application of a magnetic field to fill fluid A. The colloidal mixture of ferrofluids remains unaffected by the application of a magnetic field. That is to say, the ferromagnetic particles remain suspended in the carrier fluid despite the presence of the magnetic field. The magnetic field, however, clusters the ferromagnetic particles to increase the dielectric constant of the fluid. The carrier fluid, however, is affected by the presence of the ferromagnetic particles in the magnetic field and changes properties under the influence of the magnetic field. The magnetic field increases the viscosity of the carrier fluid to the point of becoming a viscoelastic solid. The application of the magnetic field and the resulting change in properties of the carrier fluid to form into a viscoelastic solid can also potentially be used to diagnose performance of hydraulic systems, such as that formed by isolation diaphragm 52A, isolation tube 38A and sensing diaphragm 58, and sensor 30.

Figure 3:
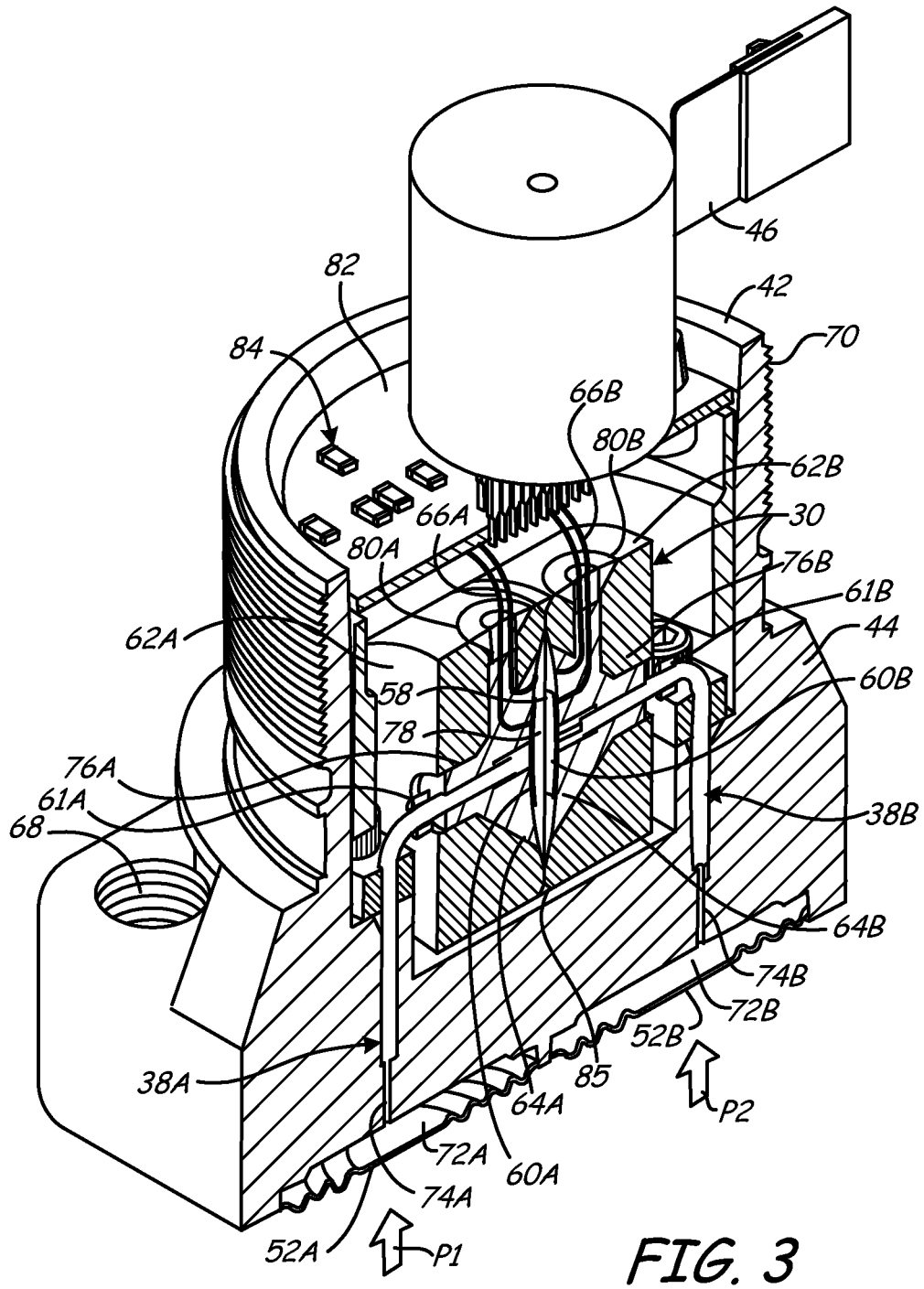
FIG. 3 is a perspective view of a differential pressure module used within the pressure transmitter of FIG. 2.

FIG. 3 shows a perspective view of one embodiment of pressure sensor 30 and module 42 used within differential pressure transmitter 12 of FIG. 2. Pressure sensor 30 is disposed on base 44 within module 42 of transmitter 12. Pressure sensor 30 includes isolation tube 38A, isolation tube 38B, sensing diaphragm 58, first electrode plate 60A, second electrode plate 60B, first electromagnet 61A, second electromagnet 61B, first cell half 62A, second cell half 62B, first insulator 64A, second insulator 64B, first sensor lead wires 66A and second sensor lead wires 66B. Electromagnets 61A and 61B are electrically powered to magnetize ferrofluids comprising fill fluid A to increase the capacitance of sensor 30.

Module 42 and base 44 are typically cast and machined as a unitary piece, with module 42 primarily comprising a hollowed out cavity for holding sensor 30. Module 42 and base 44 together provide a framework that permits diaphragms 52A and 52B to communicate with sensor 30 through isolation tubes 38A and 38B. Base 44 includes bores 68 such that transmitter 12 can be connected to flange 47 or some other process connection. Module 42 includes threads 70 for connecting with housing 40 of transmitter 12. Base 44 also includes counterbores that, along with isolation diaphragms 52A and 52B, form isolation chambers 72A and 72B, respectively. Isolation chambers 72A and 72B are connected with isolation tubes 38A and 38B, respectively, by bores 74A and 74B provided in base 44. Isolation tubes 38A and 38B typically comprise segments of stainless steel tubing welded to base 44 and cell halves 62A and 62B. Isolation tubes 38A and 38B are connected with insulators 64A and 64B, respectively, which are disposed in bores 76A and 76B, respectively, within sensor cell halves 62A and 62B. Insulators 64A and 64B comprise cup-shaped platforms upon which electrodes 60A and 60B are deposited, respectively. The cup shaped platforms mate when cell halves 62A and 62B are assembled to form interior cavity 78 within sensor 30. Insulators 64A and 64B are comprised of any suitable insulating material such as glass or ceramic. Insulators 64A and 64B include bores that extend through to interior cavity 78 such that isolation tubes 38A and 38B connect isolation chambers 72A and 72B with interior cavity 78. Sensing diaphragm 58 is disposed between cell halves 62A and 62B within interior cavity 78 such that diaphragm 58 opposes electrodes 60A and 60B. Typically, diaphragm 58 and electrode plates 60A and 60B are comprised of corrosion resistant materials. Electrodes 60A and 60B are connected to lead wires 66A and 66B, respectively, which extend through insulators 64A and 64B and exit cell halves 62A and 62B at openings 80A and 80B, respectively. Lead wires 66A and 66B are connected to circuit board 82, which includes various sensor electronics 84. Circuit board 82 is connected to transmitter electronics 28 within housing 40 through ribbon cable 46. Sensing diaphragm 58 is joined to cell half 62A and cell half 62B at weld 85.

Configured as such, sensing diaphragm 58 and electrodes 60A and 60B comprise first and second capacitors within sensor 30. Each capacitor produces an electrical signal as pressures P1 and P2 act upon sensing diaphragm 58. Pressure sensor 30 thus produces dual capacitance signals, which helps reduce error produced by sensor 30. Fill fluid A, when comprised of the above described ferrofluids, increases the dielectric constant ∈ of fill fluid A above that of conventional fill fluids. Conventional hydraulic fluids have dielectric constants ∈ of about 2. Ferrofluids increase the polarizability and dipole moment of the fill fluid in a similar fashion as do other fill fluid additives, such as detergents and anti-oxidants, which increase the dielectric constants ∈ to about 6 to about 10. The particular magnitude of increased dielectric constant varies depending on the proportion of ferromagnetic particles suspended in the colloidal mixture. In various embodiments of the invention, ferrofluids of different dielectric constants can be used in each of isolation tubes 38A and 38B to differentiate contributions to the pressure sensor signal from each of electrodes 60A and 60B. Ferrofluids thus increase the capacitance of sensor 30 beyond the typical about 60 pF to about 300 pF achieved with standard 1.25-inch diameter pressure sensors. Electromagnets 61A and 61B are used to further increase the capacitance of sensor 30. For example, electricity from transmitter circuitry 28 or circuit board 82 is delivered to magnetic coils within electromagnets 61A and 61B through appropriate wiring, as shown in FIG. 4.

Figure 4:
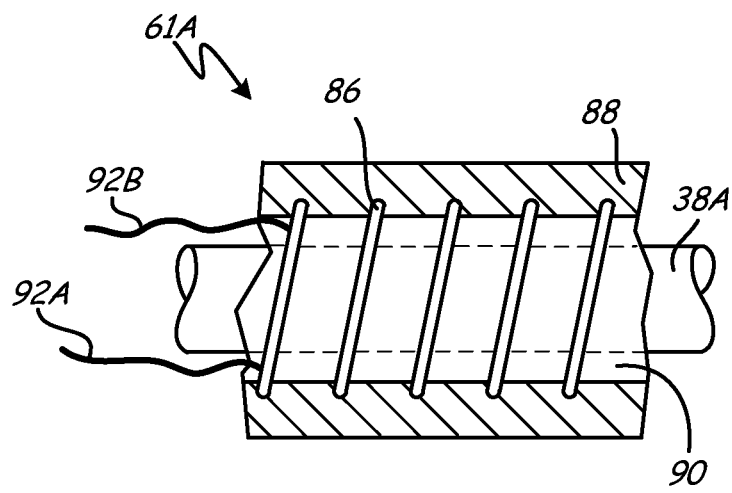
FIG. 4 shows an isolation tube of the differential pressure module of FIG. 3 having an electromagnet wrapped in a magnetic shield.

FIG. 4 shows one embodiment of electromagnet 61A of FIG. 3. Electromagnet device 61A comprises wire coil winding 86, shielding sleeve 88 and core sleeve 90, which are concentrically wrapped around isolation tube 38A. Lead wires 92A and 92B connect coil winding 86 to circuit board 82 (FIG. 3). Shielding sleeve 88 is shown cut-away in FIG. 4 to show core sleeve 90 and coil winding 86. As shown in FIG. 3, electromagnet 61A extends across only a segment of isolation tube 38A. However, in other embodiments, core sleeve 90, coil winding 86 and shielding sleeve 88 may extend across the entire length of isolation tube 38A, or along the length of isolation tube 38A between cell half 62A and base 44. In still other embodiments, electromagnets are positioned within housing 40 in any position so long as they are within magnetic proximity to the fill fluid. That is to say, the electromagnets must be positioned so as to be able to magnetically affect the fill fluid. In yet other embodiments of the invention, a permanent magnet having a known field strength can be applied to the outside of housing 40 to activate the ferromagnetic particles.

In one embodiment of the invention, isolation tube 38A comprises a 0.065 inch (0.165 cm) diameter stainless steel tube. Wire coil winding 86 may comprise any suitable wire as is commercially available. In one embodiment, winding 86 is comprised of a copper wire that is commonly used to produce electromagnets. Core sleeve 90 comprises a layer of ferromagnetic material, such as soft iron, that has a high magnetic permeability μ. In other embodiments, isolation tube 38A acts as the core or no core is used. Shielding sleeve 88 is positioned around coil winding 86 and core sleeve 90 to prevent outside magnetic fields from influencing coil winding 86. Furthermore, magnetic shielding is needed to prevent outsider interference with the ferrofluid within isolation tube 38A. In one embodiment, shielding sleeve 88 comprises a mesh sleeve of metallic material. Shielding sleeve 88 thus provides a barrier to outside magnetic fields, but permits a magnetic field generated by coil winding 86 to penetrate isolation tube 38A. In other embodiments of the invention, transmitter housing 40 provides a sufficient shield to coil winding 86. Housing 40 provides a closed container comprised of a magnetic material having sufficiently high magnetic permeability to inhibit interference with an outside magnetic field. In particular, housing 40 is made of cast 316 stainless steel, which results in the steel having some degree of retained ferrite. The magnetism of the retained ferrite draws in outside magnetic fields to provide a flux path that does not intersect the fill fluid pathway within isolation tube 38A.

According to this embodiment, lead wires 92A and 92B draw power from circuit board 82. The flow of current through wires 92A and 92B produces a magnetic field. The magnetic filed is enhanced by the presence of core sleeve 90. The resulting electromagnetic field energizes the ferromagnetic particles within the carrier fluid, causing the ferromagnetic particles to form clusters. The clustered particles increase the dielectric constant ∈ of fill fluid A within isolation tube 38A. Using a carrier fluid of mineral oil and ferromagnetic particles of $Fe_3O_4$, tests have shown that an applied magnetic field forms clusters about 2 to about 3 micro-meters long, increasing the dielectric constant ∈ about 20%, as compared to that when no magnetic field is applied to the ferrofluid.

A 20% increase in dielectric constant would produce a 20% increase in the output signal of sensor 30. Such a known proportion can be used to diagnose performance of sensor 30. Application of a magnetic field to the fill fluid would produce a stepped increase of the pressure sensor signal, independent of pressure range of the sensor, that can be varied based on the applied magnetic field strength. If the applied magnetic field strength and the corresponding step increase in signal strength are known ahead of time, the relationship can be used as a diagnostic tool to evaluate operability of sensor 30. The relationship could also be used as a calibration check.

Figure 5:
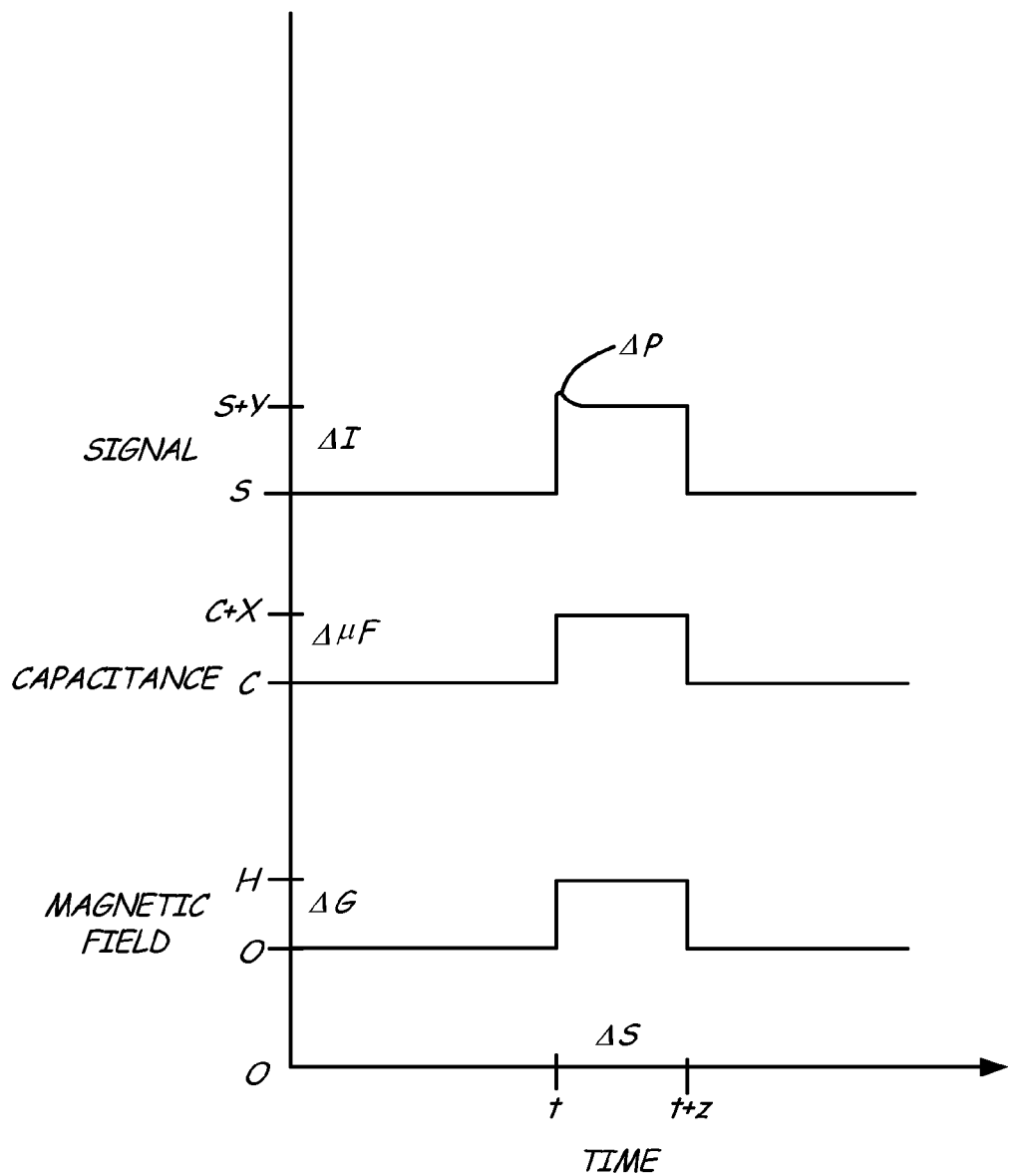
FIG. 5 shows a graph correlating the application of a magnetic field to a pressure sensor having a ferrofluid modified fill fluid with the capacitance of the pressure sensor and signal generated by the pressure sensor.

FIG. 5 shows a graph correlating the application of magnetic field H to pressure sensor 30 having a ferrofluid as fill fluid A with capacitance C of pressure sensor 30 and signal S generated by pressure sensor 30. As shown, at the left hand side of the graph the magnetic field is zero at time zero. Some seconds later at time t, magnetic field H is applied to pressure sensor 30 such that field H undergoes an increase in Gausses, ΔG. Correspondingly, at time t, capacitance C of sensor 30 increases to C+X, where X equals some increase in picoFarads, ΔpF, and signal S of sensor 30 increases to S+Y, where Y equals some increase in signal ΔI. Capacitance C represents the improved capacitance of sensor 30 over conventional fill fluids such that $C=C_0+\Delta C_{ferrofluid}$, wherein $C_0$ is the capacitance of conventional hydraulic fluid and $\Delta C_{ferrofluid}$ is the increase in capacitance from the presence of ferromagnetic nanoparticles. The increase in capacitance X and increase in signal Y are maintained for a period of time Z, where Z equals some increase in seconds Δs, at which point capacitance C and signal S return to pre-magnetization levels. The increase in capacitance X and increase in signal Y can be regenerated by simply reapplying the same magnetic field H. The magnitudes of X and Y can be varied by varying the filed strength of H either at different intervals or within the same interval.

The increase in capacitance C occurs almost instantaneously and is maintained constant at the increased level C+X for as long as magnetic field H is applied. When magnetic field H is terminated capacitance C returns to the level it was at time zero almost instantaneously. Similarly, signal S increases and decreases almost instantaneously with the application and termination of magnetic field H, respectively. However, signal S undergoes a further, momentary increase at time t caused by a pressure pulse due to the shape changing quality of the ferrofluid of an increase in pressure ΔP that arises from the magnetization of the ferromagnetic particles in the ferrofluid. FIG. 5 also shows this effect labeled as ΔP which is similar to creating pressure pulses through the shape changing properties of piezoelectric materials. Therefore using ferrofluid as a fill fluid causes three effects; 1) a fixed increase in the capacitance signal due to increasing the dielectric constant of the fluid, 2) a controllable increase in the capacitance signal due to increasing the dielectric constant of the fluid by applying a magnetic field, and 3) a momentary pressure pulse ΔP when the magnetic field is applied. The controllable increase of the dielectric constant and the momentary pressure pulse can both be used to evaluate and diagnose the operation of sensor 30.

Pressure ΔP produced by magnetic field H being applied to ferromagnetic particles suspended in the fill fluid can be used to analyze other conditions of pressure sensor 30, transmitter 12 and process control system 10. The increase in signal S+Y and the shape of pressure ΔP and a known strength of magnetic field H can be predetermined and stored in transmitter electronics 28 for a set configuration of transmitter 12. The sensed change in pressure from application of magnetic field H can be compared to the stored value of pressure ΔP to diagnose system conditions. For example, the magnitude of the sensed pressure may be greater than the magnitude of pressure ΔP, indicating a plugged process connection where diaphragm 52A is inhibited from moving such that sensing diaphragm 58 is deflected a greater amount than expected. The magnitude of the sensed pressure may be less than the magnitude of pressure ΔP, indicating a ruptured sensing diaphragm 58 such that pressure within the fill fluid produces no or little movement. Sometimes, it is possible for fill fluid to leak out of the sensing system. As such, the sensing diaphragm will not move or detect a change in pressure ΔP. Similarly, if the hydraulic system was improperly filled and there was air sealed within the sensor system, the air would compress under the pressure ΔP. Thus, a flat-line pressure output in response to a pulsed power input to an electromagnet device may be indicative of a hydraulic system having a leak (low fill fluid level), an open process connection or the presence of air. Such a flat-line pressure output may also be indicative of an open process connection where a change in pressure of the process fluid results in no visible change to the pressure signal. Such relationships are known and discussed in U.S. Pat. No. 7,918,134 and U.S. Pat. App. Pub. No. 2010/0083731, both of which are assigned to Rosemount Inc. Additionally, similar diagnostic procedures can be carried out in other types of industrial process transmitters that utilize hydraulic systems, such as level indicators.

Transmitter circuitry 28 can be used to calibrate output of sensor 30 using a varying magnetic field strength. For example, a series of power inputs into electromagnet device 61A is used to generate a set of corresponding step-increases in pressure signal output. The power pulses produce magnetic fields of different strengths that increase the dielectric constant of the fill fluid to different levels, which increases the capacitance of sensor 30 to different levels. The different levels of capacitance correspondingly produce an increase in current of the pressure sensor signal output. Because of the known relationship between power input, magnetic field strength, dielectric constant and capacitance, the change in magnitude of the resulting sensor signal output should correspond to the change in magnitude of power input. The change in magnitudes of pressure signal output changes linearly with change in magnitudes of capacitance. The magnitudes of the magnetic field strengths are known based on the dimensions of the coil and core. Thus, by inducing a series of magnetic fields with known power pulses, the resulting pressure signal responses can be compared to an expected pressure response curve to verify that the pressure sensor is properly calibrated. If pressure signal responses do not fit the expected relationship or curve, it is an indication that the pressure sensor is out of calibration. Expected pressure response data is stored within memory coupled to transmitter circuitry 28 or circuit board 82.

In other embodiments of the invention, rather than providing a power input to an electromagnet, a permanent magnet having a known field strength can be applied to a reference position on housing 40 to induce an increase of capacitance of sensor 30. In such configurations, it may be advantageous to provide different concentrations of ferrofluids in each of isolation tubes 38A and 38B to facilitate application of the magnetic field. For example, one of the isolation tubes may be located within housing 40 further away from walls of the housing, making it more difficult to apply the magnetic field of a permanent magnet. The difference in distance from the permanent magnet to each isolation tube can be offset by varying the amount of ferromagnetic particles in each isolation tube. As with the previously described embodiments, application of a permanent magnet having a known magnetic field strength should produce a known, predetermined response in a healthy, properly functioning pressure sensor and transmitter.

Increased capacitance permits more rangeability and better signal to noise ratios. For example, a typical transmitter can be ranged down from measuring 0 in/$H_2O$ to 1000 in/$H_2O$ (~250 kPa) to 0 in/$H_2O$ to 100 in/$H_2O$ (~25 kPa). At 100 in/$H_2O$, there is still enough signal to provide adequate performance. However, with the increased capacitance of the present invention, the transmitter can be ranged down to, for example, 50 in/$H_2O$ (~12.5 kPa) due to the additional signal available.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure transmitter for measuring a pressure of a process fluid, the pressure transmitter comprising:
   a transmitter housing;
   a pressure sensor for sensing the pressure of the process fluid, wherein the pressure sensor is disposed within the housing;
   a hydraulic relay system comprising:
      a first isolation diaphragm positioned on an exterior of the transmitter housing; and
      a first isolation tube extending from the pressure sensor to the first isolation diaphragm;
   a first ferrofluid located in the first isolation tube for transmitting a change in the pressure of the process fluid at the first isolation diaphragm to the sensor; and
   transmitter electronics positioned within the housing, the transmitter electronics configured to receive and condition a pressure signal from the pressure sensor.

2. The pressure transmitter of claim 1 wherein the first ferrofluid comprises:
   a carrier fluid; and
   a first volume of ferromagnetic particles suspended within the carrier fluid for altering properties of the first ferrofluid.

3. The pressure transmitter of claim 2 wherein the ferromagnetic particles are coated with a surfactant to prevent agglomeration.

4. The pressure transmitter of claim 2 wherein the carrier fluid is selected from the group consisting of mineral oil and a silicone-oil.

5. The pressure transmitter of claim 2 wherein the ferromagnetic particles are selected from the group consisting of $Fe_3O_4$, $\alpha Fe_2O_3$, magnetite and maghemite.

6. The pressure transmitter of claim 2 wherein the ferromagnetic particles increase the dielectric constant of the carrier fluid.

7. The pressure transmitter of claim 2 wherein the ferrofluid comprises a colloidal solution of the ferromagnetic particles suspended within the carrier fluid such that a paramagnetic fluid is formed.

8. The pressure transmitter of claim 1 wherein the hydraulic relay system further comprises:
    a second isolation diaphragm positioned on an exterior of the transmitter housing;
    a second isolation tube extending from the pressure sensor to the second isolation diaphragm; and
    a second ferrofluid disposed within the second isolation tube, the second ferrofluid having a concentration of ferromagnetic particles different than that of the first ferrofluid.

9. The pressure transmitter of claim 1 and further comprising:
    an electromagnet coupled to the pressure transmitter in a position so as to be able to apply a magnetic field to the hydraulic relay system.

10. The pressure transmitter of claim 9 wherein the electromagnet comprises:
    a ferromagnetic core wrapped around the first isolation tube; and
    a conductive coil wrapped around the ferromagnetic core and electrically coupled to the transmitter electronics.

11. The pressure transmitter of claim 10 and further comprising:
    a magnetic shield wrapped around the conductive coil.

12. The pressure transmitter of claim 1 wherein the housing is comprised of a ferromagnetic material so as to provide a magnetic shield to the first ferrofluid.

13. The pressure transmitter of claim 1 wherein the pressure sensor comprises a capacitance-based pressure sensor.

14. A method for diagnosing performance of a pressure sensor in an industrial process transmitter, the method comprising:
    applying fluid pressure to a pressure sensor through a hydraulic system having a ferrofluid to produce a pressure signal representative of sensed pressure;
    applying a magnetic field to the ferrofluid to cause a change in capacitance of the pressure sensor;
    monitoring a change in pressure signal output of the pressure sensor in response to the application of the magnetic field; and
    diagnosing performance of the industrial process transmitter based on the pressure signal output and the magnetic field.

15. The method of claim 14 and further comprising comparing a field strength of the magnetic field to a magnitude of a step increase of the pressure signal output.

16. The method of claim 15 and further comprising:
    generating a diagnostic signal based on a comparison of the field strength to the magnitude of the step increase of the pressure signal output; and
    communicating the diagnostic signal over a control loop connected to circuitry within the transmitter.

17. The method of claim 16 wherein the diagnostic signal is compared to predetermined data stored in the transmitter.

18. The method of claim 14 wherein the step of diagnosing performance of the pressure sensor comprises checking calibration of the pressure sensor.

19. The method of claim 14 wherein the step of applying a magnetic field to the ferrofluid comprises:
    placing a permanent magnet in proximity to the ferrofluid.

20. The method of claim 14 wherein the step of applying a magnetic field to the ferrofluid comprises:
    sending a power input from the transmitter electronics to an electromagnet coupled to the hydraulic system.

21. The method of claim 20 wherein the step of diagnosing performance of the pressure sensor comprises comparing the power input to the pressure signal output.

22. The method of claim 14 wherein the step of applying a magnetic field to the ferrofluid further comprises varying a field strength of the magnetic field.

23. The method of claim 14 wherein the step of applying a magnetic field to the ferrofluid further comprises producing a pressure pulse within the ferrofluid that influences the pressure signal output.

24. The method of claim 23 wherein a diagnostic test result is produced by comparing an expected change in the pressure signal output in response to the pressure pulse with an actual response of the pressure signal output.

25. The method of claim 24 wherein the step of diagnosing performance of the industrial process transmitter comprises determining a presence of air or gas in the fill fluid, a ruptured isolation diaphragm, low fill fluid, or an open process connection when the magnetic field does not produce a change in the pressure signal output or produces a negligible change in the pressure signal output.

26. The method of claim 24 wherein the step of diagnosing performance of the industrial process transmitter comprises determining a plugged process connection when the actual response of the pressure signal output is greater than an expected change in the pressure signal output.

27. The method of claim 24 wherein the step of diagnosing performance of the industrial process transmitter comprises determining a corrupted sensor diaphragm when the actual response of the pressure signal output is less than the expected change in the pressure signal output.

* * * * *